US011599337B2

(12) United States Patent
Epstein et al.

(10) Patent No.: US 11,599,337 B2
(45) Date of Patent: *Mar. 7, 2023

(54) DATAFLOW GRAPH CONFIGURATION

(71) Applicant: Ab Initio Technology LLC, Lexington, MA (US)

(72) Inventors: Richard A. Epstein, Yarmouth, ME (US); Mike Palmer, Raleigh, NC (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,286

(22) Filed: Oct. 25, 2021

(65) Prior Publication Data

US 2022/0043635 A1 Feb. 10, 2022

Related U.S. Application Data

(63) Continuation of application No. 15/997,278, filed on Jun. 4, 2018, now Pat. No. 11,194,551.
(Continued)

(51) Int. Cl.
*G06F 8/34* (2018.01)
*G06F 9/445* (2018.01)
(Continued)

(52) U.S. Cl.
CPC .............. *G06F 8/34* (2013.01); *G06F 9/4451* (2013.01); *G06F 9/44505* (2013.01); *G06F 9/451* (2018.02); *G06F 16/254* (2019.01)

(58) Field of Classification Search
None
See application file for complete search history.

(56) References Cited

U.S. PATENT DOCUMENTS 7,614,036 B2 11/2009 Bjornson
7,716,630 B2 5/2010 Wholey
(Continued)

FOREIGN PATENT DOCUMENTS

JP 2008-547134 12/2008
JP 2013-528884 6/2013
JP 2017-500646 2/2018

OTHER PUBLICATIONS

Bouakaz, A., et al., Survey of Parametric Dataflow Models of Computation, ACM Transactions on Design Automation of Electronic Systems, vol. 22, Issue 2, Mar. 2017, pp. 1-25, [retrieved on Aug. 13, 2021], Retrieved from the Internet: <URL:http://dl.acm.org/>.*
Ko, D-I., et al., Dynamic Configuration of Dataflow Graph Topology for Dsp System Design, IEEE International Conference on Acoustics, Speech, and Signal Processing, 2005, pp. 69-72, [retrieved on Aug. 13, 2021], Retrieved from the Internet: <URL:http://ieeexplore.ieee.org/>.*
(Continued)

*Primary Examiner* — Geoffrey R St Leger
(74) *Attorney, Agent, or Firm* — Fish & Richardson P.C.

(57) ABSTRACT

A method for configuring a first computer executable program includes through a user interface, receiving information indicative of a source of data and a data target; and receiving a characterization of a process, including a type of the process and values for characteristics associated with the process. The method includes based on the received information, automatically assigning values to respective parameters of the first computer executable program to cause the first computer executable program to, when executed, receive data from the source of data and output data to the data target. The method includes automatically configuring the first computer executable program to reference a second computer executable program, including identifying the
(Continued)

second computer executable program based on the type of the process; and assigning values to respective parameters of the second computer executable program based on the values for the respective characteristics.

24 Claims, 14 Drawing Sheets

Related U.S. Application Data

(60) Provisional application No. 62/516,396, filed on Jun. 7, 2017.

(51) Int. Cl.
*G06F 16/25* (2019.01)
*G06F 9/451* (2018.01)

(56) References Cited

U.S. PATENT DOCUMENTS

| | | |
|---|---|---|
| 8,429,631 B2 | 4/2013 | Schumacher et al. |
| 9,092,639 B2 | 7/2015 | Winters et al. |
| 9,575,639 B2 | 2/2017 | Yost et al. |
| 10,180,821 B2 | 1/2019 | Larson et al. |
| 2004/0056908 A1 | 3/2004 | Bjomson |
| 2005/0076002 A1 | 4/2005 | Williams |
| 2007/0011668 A1 | 1/2007 | Wholey |
| 2011/0145748 A1 | 6/2011 | Farver et al. |
| 2015/0242093 A1 | 8/2015 | Yost et al. |
| 2019/0095176 A1 | 3/2019 | Larson et al. |

OTHER PUBLICATIONS

Office Action in Japanese Appln. No. 2018282168, dated Jul. 1, 2022, 20 pages (with English translation).
Office Action in Australian Appln. No. 2018282168, dated Feb. 21, 2022, 4 pages.
Khoral Research Inc., "The Khoros Visual Programming Environment, Chapter 1 and Appendix A", Internet citation, XP002293306, 1994)8.
Knight et al., "Professional Microsoft SQL Server 2014 Integration Services", in: "Professional Microsoft SQL Server 2014 Integration Services", John Wiley & Sons, Incorporated, XP055501528 (2014).
PCT International Preliminary Report on Patentability issued in PCT/US2018/035976, dated Dec. 19, 2019, 10 pages.
PCT International Search Report and Written Opinion issued in PCT/US2018/035976, dated Sep. 10, 2018.
SG Office Action in Singapore Appln. No. 11201910233R, dated May 17, 2021, 5 pages.

* cited by examiner

DATAFLOW GRAPH CONFIGURATION

CLAIM OF PRIORITY

This application is a continuation of U.S. patent application Ser. No. 15/997,278, filed on Jun. 4, 2018, which claims priority to U.S. patent application Ser. No. 62/516,396, filed on Jun. 7, 2017, the contents of which are incorporated here by reference in their entirety.

BACKGROUND

A user interface can be generated and displayed to a user to allow the user to interact with data that is processed by a computational system. Some user interfaces are static components of an application program and the user interfaces operate in the same way for multiple users of the problem. Some user interfaces can be defined by a user of the application program so that the user interface is custom-tailored for a particular purpose. For example, an application program may allow the specification of multiple user interfaces and a user can choose from among the multiple user interfaces.

SUMMARY

In an aspect, a method for configuring a first computer executable program includes through a user interface, receiving information indicative of a source of data and a data target; through the user interface, receiving a characterization of a process, the characterization including a type of the process and values for respective characteristics associated with the process. The method includes based on the received information, automatically assigning values to respective parameters of the first computer executable program to cause the first computer executable program to, when executed, receive data from the source of data and output data to the data target. The method includes based on the received characterization of the process, automatically configuring the first computer executable program to reference a second computer executable program. The configuring includes identifying the second computer executable program based on the type of the process; and assigning values to respective parameters of the second computer executable program based on the values for the respective characteristics associated with the process.

Embodiments can include one or more of the following features.

The first computer executable program includes a first dataflow graph including one or more nodes representing data processing components and one or more links representing flows of data between the data processing components.

The second computer executable program includes a second dataflow graph including one or more nodes representing data processing components and one or more links representing flows of data between the data processing components.

The information indicative of the source of data identifies a type of the source of data. Receiving the information indicative of the source of data includes receiving a selection of the type of the source of data from among a set of one or more types. The set of one or more types includes one or more of a file, a table, an HDFS dataset, a HIVE table, and a queue.

The information indicative of the source of data includes information indicative of a location of the source of data.

The information indicative of the data target identifies a type of the data target. Receiving the information indicative of the data target includes receiving a selection of the type of the data target from among a set of one or more types. The set of one or more types includes one or more of a file, a table, an HDFS dataset, a HIVE table, and a queue.

The information indicative of the data target includes information indicative of multiple data targets.

The information indicative of the data target includes information indicative of a location of the data target.

The characterization of the process includes a characterization of each of multiple processes.

The method includes determining the characteristics associated with the process based on the type of the process.

Receiving a characterization of a process includes receiving a selection of a particular process from among a set of one or more processes. The processes of the set include one or more of a mapping process, a filter process, a deduplication process, an aggregation process, a replicate process, a normalization process, a partition and sort process, a change data capture process, and a join process.

The method includes automatically configuring the first dataflow graph to reference the second dataflow graph at runtime of the first dataflow graph.

Automatically configuring the first dataflow graph to reference the second dataflow graph includes configuring the first dataflow graph to execute the second dataflow graph during execution of the first dataflow graph.

In an aspect, a non-transitory computer readable medium stores instructions for causing a computing system to configuring a first computer executable program. The instructions include instructions for causing the computing system to through a user interface, receive information indicative of a source of data and a data target; through the user interface, receive a characterization of a process, the characterization including a type of the process and values for respective characteristics associated with the process; based on the received information, automatically assign values to respective parameters of the first computer executable program to cause the first computer executable program to, when executed, receive data from the source of data and output data to the data target; and based on the received characterization of the process, automatically configure the first computer executable program to reference a second computer executable program. The configuring includes identifying the second computer executable program based on the type of the process; and assigning values to respective parameters of the second computer executable program based on the values for the respective characteristics associated with the process.

In an aspect, a computing system for configuring a first computer executable program includes one or more processors and a memory, the one or more processors and memory configured to through a user interface, receive information indicative of a source of data and a data target; through the user interface, receive a characterization of a process, the characterization including a type of the process and values for respective characteristics associated with the process; based on the received information, automatically assign values to respective parameters of the first computer executable program to cause the first computer executable program to, when executed, receive data from the source of data and output data to the data target; and based on the received characterization of the process, automatically configure the first computer executable program to reference a second computer executable program. The configuring includes identifying the second computer executable program based on the type of the process; and assigning values to respective parameters of the second computer executable program based on the values for the respective characteristics associated with the process.

In an aspect, a computing system for configuring a first computer executable program includes means for receiving, through a user interface, information indicative of a source of data and a data target; means for receiving, through the user interface, a characterization of a process, the characterization including a type of the process and values for respective characteristics associated with the process; means for, based on the received information, automatically assigning values to respective parameters of the first computer executable program to cause the first computer executable program to, when executed, receive data from the source of data and output data to the data target; and means for, based on the received characterization of the process, automatically configuring the first computer executable program to reference a second computer executable program. The configuring includes identifying the second computer executable program based on the type of the process; and assigning values to respective parameters of the second computer executable program based on the values for the respective characteristics associated with the process.

DETAILED DESCRIPTION

We describe here an approach to configuring a dataflow graph based on characteristics provided by a user. The characteristics can define a source of data to be processed by the dataflow graph, a target for data output from the dataflow graph, and can define the processing to be performed on the data by the dataflow graph. The type of processing to be performed can be selected from a library of available options. A generic, reusable dataflow graph is parameterized according to these characteristics.

Figure 1:
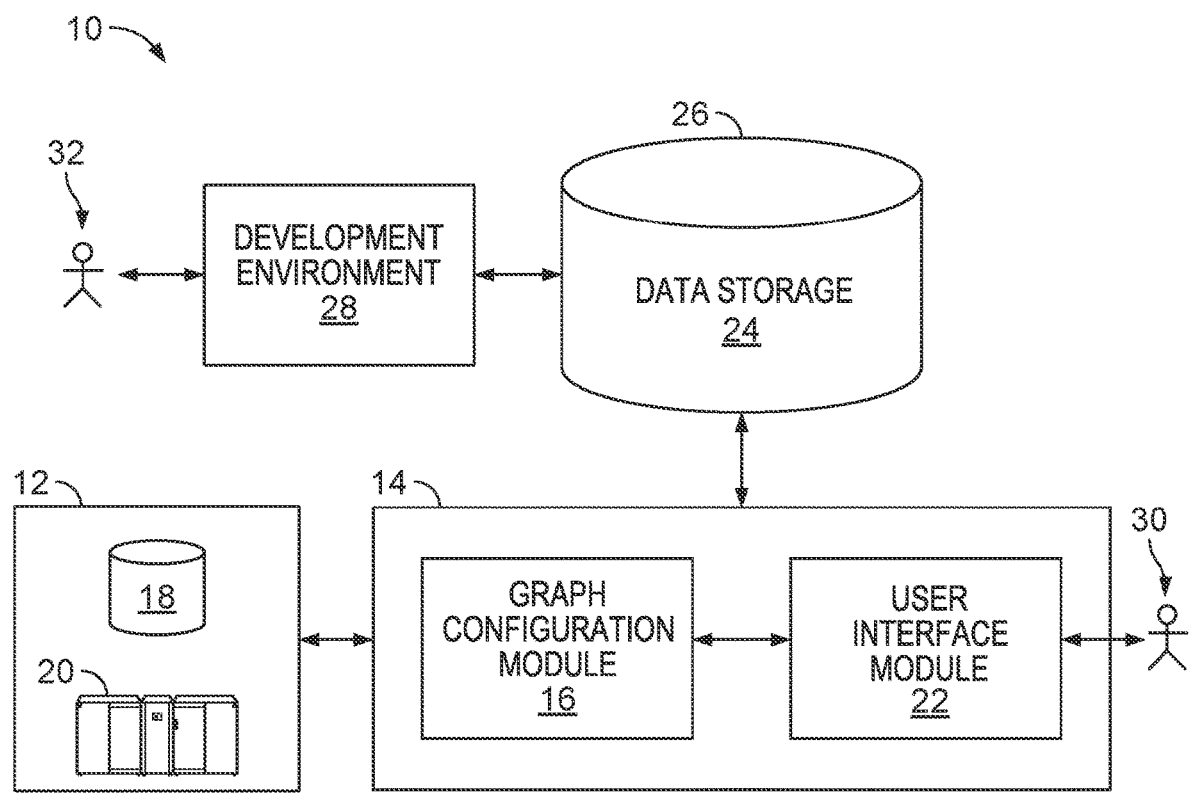
FIG. 1 is a system diagram.

Referring to FIG. 1, an example system 10 for configuring dataflow graphs includes a data source 12 that may include one or more sources of data such as storage devices or connections to online data streams, each of which may store data in any of a variety of storage formats (e.g., database tables, spreadsheet files, flat text files, or a native format used by a mainframe). An execution environment 14 includes a graph configuration module 16 and a user interface module 22. The execution environment 14 may be hosted on one or more general-purpose computers under the control of a suitable operating system, such as the UNIX operating system. For example, the execution environment 14 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The graph configuration module 16 changes the configuration of dataflow graphs, as described in more detail below. The user interface module 22 displays configuration information to a user 30 and receives configuration actions from the user 30. The user interface module 22 also communicates with the graph configuration module 16, which configures dataflow graphs based on the actions of the user. For example, the dataflow graphs can be stored in the data source 12. Storage devices providing the data source 12 may be local to the execution environment 14, for example, being stored on a storage medium connected to a computer running the execution environment 14 (e.g., hard drive 18), or may be remote to the execution environment 14, for example, being hosted on a remote system (e.g., mainframe 20) in communication with a computer running the execution environment 14 over a local or wide area data network.

The execution environment is in communication with a data storage system 26 which contains information used by the user interface module 22 to display a user interface. The data storage system 26 is also accessible to a development environment 28 in which a developer 30 is able to develop user interfaces, stored in the data storage system 26, that are used by the user interface module 22 to display a user interface.

The data source 12 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

A dataflow graph is a computer program executed within a dataflow graph execution environment that processes data from one or more data sources. The data from the data sources are manipulated and processed according to the dataflow graph and exported to one or more data sinks. Data sources and sinks can include files, databases, data streams, or queues, for example. Dataflow graphs are represented as directed graphs including nodes representing data processing components each including code for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different sources and sinks to be substituted readily, for example. Furthermore, in some arrangements, the flow of the dataflow graph may be altered by the use of parameters, such that a component or a series of components may be bypassed. In general, a parameter represents a property of a dataflow graph that can be configured or changed. For example, a property can be changed between uses of the dataflow graph, and the dataflow graph may perform operations differently as a result of the change. A dataflow graph can be configured at compile time, by altering the dataflow graph pre-compilation to perform a particular action, or at run-time, by setting parameters or altering configuration files that are used by the dataflow graph.

Figure 2:
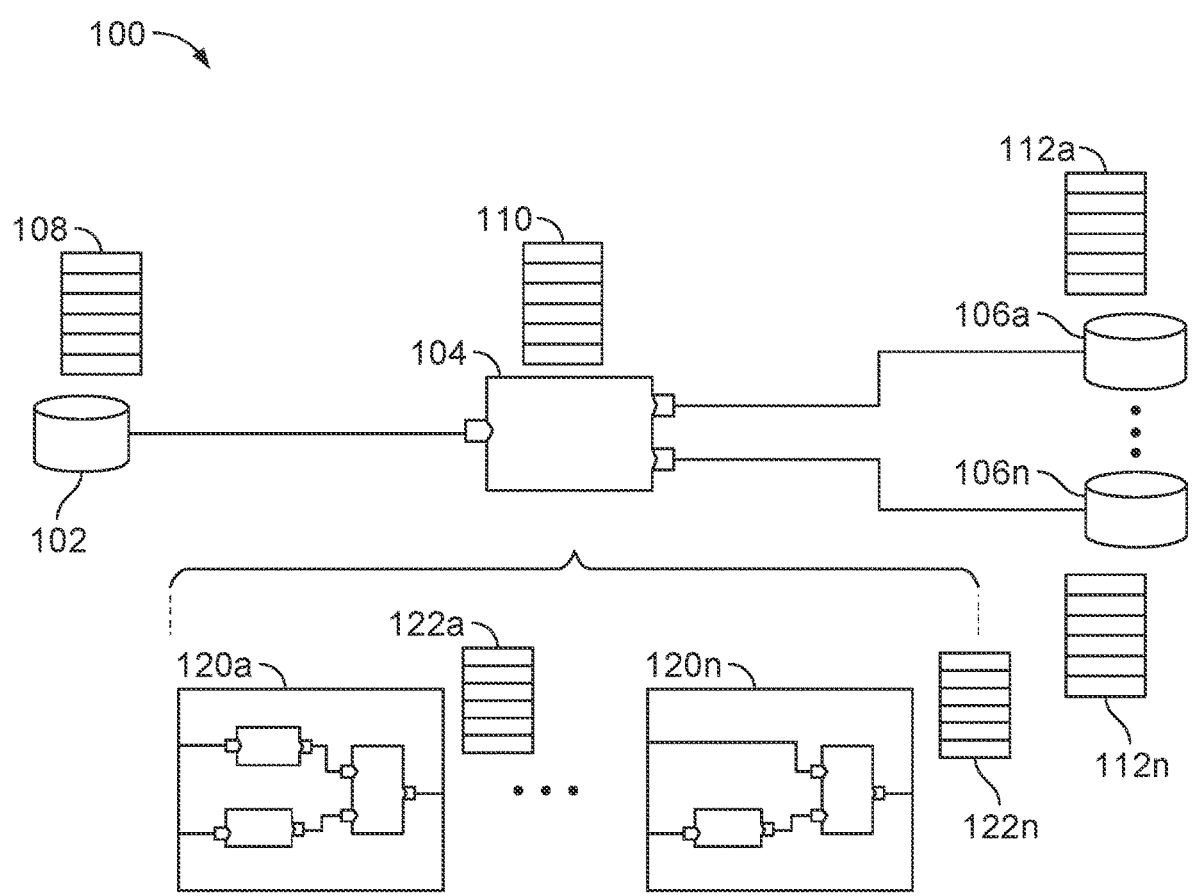
FIG. 2 is a diagram of a dataflow graph.

For example, referring to FIG. 2, a generic dataflow graph 100 includes a data source 102, a component 104, and data sinks 106a-106n. The data source 102 is connected to the input port of the component 104. The output port of the component 104 is connected to the data sinks 106a-106n. The connections between the data source, the component, and the data sinks define the data flow through the dataflow graph.

Each of the data source 102, the component 104, and the data sinks 106a-106n is associated with a parameter set 108, 110, 112a-112n, respectively, each parameter set including one or more parameters. The parameters define the behavior of the dataflow graph. For example, a parameter can define the location of the data source or data sink on a physical disk. A parameter can also define the behavior of a component, such as how a sorting component sorts the data input into the component. In some examples, values for the parameters in a parameter set are populated at run time of the dataflow graph.

In some examples, the value of one parameter can depend on the value of another parameter. For instance, a data source may be stored in a file in a particular directory. The parameter set for the data source can include a first parameter called "DIRECTORY" and a second parameter called "FILENAME." In this example, the FILENAME parameter depends on the DIRECTORY parameter (e.g., DIRECTORY may be "/usr/local/" and FILENAME may be "input.dat"). Parameters may also depend upon the parameters for other components. For example, the physical location of a data sink for a dataflow graph may depend upon the physical location of the data source for the dataflow graph. For instance, a data sink can include a set of parameters which includes a FILENAME parameter which depends upon the DIRECTORY parameter of the data source (e.g., the FILENAME parameter for the data sink may be "/usr/local/output.dat" where the value "/usr/local/" is obtained from the DIRECTORY parameter for the data source).

The component 104 can be a graph interface component that references one or more other dataflow graphs 120a-120n, sometimes referred to as subgraphs. At run time, the dataflow graph 100 dynamically loads and executes the subgraph(s) referenced by the component 104, e.g., enabling the dataflow graph 100 to flexibly access various functionalities provided by the subgraphs 120a-120n. One or more parameters of the component 104 defines the specific subgraph(s) 120a-120n referenced by the component 104. Each subgraph 120a-120n is also associated with a parameter set 122a-122n including one or more parameters, each of which defines the behavior of the corresponding subgraph.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed. The interface allows a user to configure the parameters of a parameterized dataflow graph even if the user lacks technical knowledge relating to dataflow graphs and dataflow graph configuration.

A configuration interface, presented on a client device, enables a user to access the graph configuration module 16 of FIG. 1. Through the configuration interface, the user can specify characteristics of the data source, the data sinks, and the transformations to be performed by the dataflow graph, without needing technical knowledge about dataflow graph configuration. Based on the characteristics specified by the user, parameter values can be assigned for the parameter sets 108, 110, 112a-112n, 122a-122n thus defining the behavior of the dataflow graph according to the characteristics specified by the user.

Within the configuration interface, the parameters of the parameter sets 108, 110, 112a-112n can be combined and reorganized into groups for interacting with a user, e.g., reflecting business considerations rather than technical considerations. The configuration interface for receiving values for the parameters based on user input can display different parameters according to relationships among parameters in a flexible way that is not necessarily restricted by aspects of the development environment on the server. An example of a configuration interface is described in U.S. Publication No. 2011/0145748, the contents of which are incorporated here by reference in their entirety.

Figure 3:
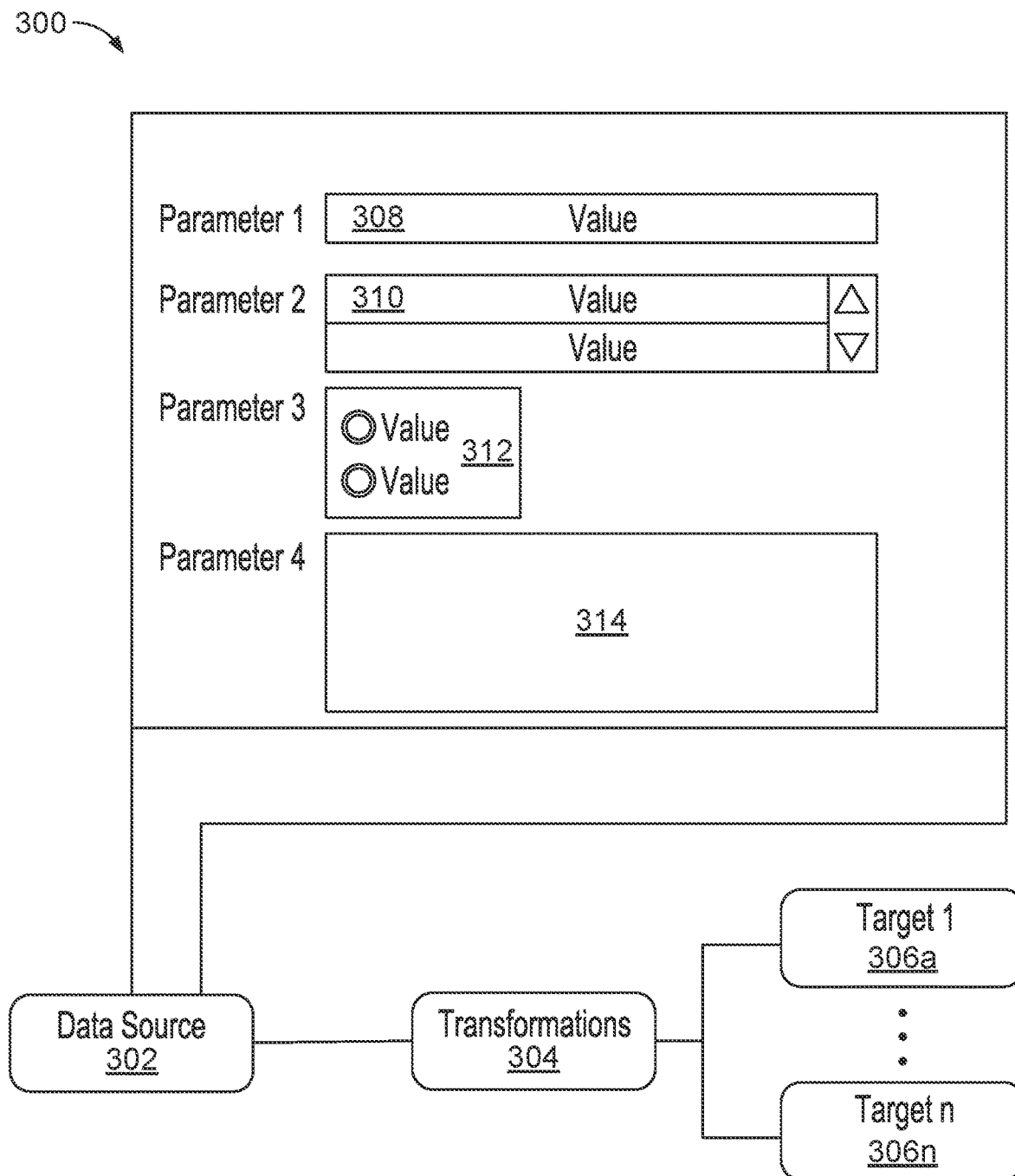
FIG. 3 is a diagram of a user interface.

Referring to FIG. 3, a configuration interface 300 enables a user to assign values to parameters of the dataflow graph 100. In the example of FIG. 3, the parameters are divided into a first group of parameters, represented by a source icon 302 representing parameters for the data source 102, a transformation icon 304 representing parameters for the component 104, and a sink icon 306a-306n each representing parameters for a corresponding one of the data sinks 106a-106n. The user can enter characteristics associated with each of the icons. Based on the characteristics entered by the user, values for the parameters for the data source 102, the data sinks 106a-106n, and the component 104 can be determined.

In the example of FIG. 3, a first characteristic associated with the source icon 302 is displayed as a text box 308 in which the user can enter text. The type of text can be constrained (e.g., integers, floating point values, strings, or other types) or can accept any type of text. A second characteristic is displayed as a drop down list 310 with prepopulated values. A third characteristic is displayed as a radio button 312. A field 314 for a fourth characteristic permits a user to enter a larger amount of text. Other types of displays can also be used. For instance, a user may be able to open a file selector to select a particular dataset to use as a data source, or a location from which a dataset is to be accessed or downloaded over a network. Characteristics associated with the sink icons 306a-306n and the transformation icon 304 can also be entered.

The characteristics associated with the source icon 302 or the sink icons 306a-306n can include a characteristic indicative of the type of dataset for the data source 102 or one of the data sinks 106a-106n. For instance, the user can be prompted to select a type of dataset from among a list of supported types, such as files, tables, HDFS (Hadoop distributed file system) datasets, HIVE tables, queues, or other types. By files, we mean data having a form that can be described as a file, or defined with a record format compatible with the implementation of the dataflow graph 100. For instance, MVS (multiple virtual storage) files are examples of files. The user can be prompted to specify a path or location of the dataset. Other characteristics for which the user is prompted can depend on the type of dataset selected by the user. For instance, the user can enter characteristics related to a record format of the dataset, a key for the dataset, a configuration file for a table dataset, a type of compression or encryption, or other characteristics. When multiple data sinks are used, each data sink can have its own type of dataset and other associated characteristics.

The entered characteristics associated with the source icon 302 are used to automatically parameterize the data source 102 such that, when executed, the dataflow graph receives data from the appropriate source. Similarly, the entered characteristics associated with each sink icon 306a-306n are used to automatically parameterize each data sink 106a-106n such that, when executed, data output from the dataflow graph 100 is sent to the appropriate destination.

The characteristics associated with the transformation icon 304 can include a characteristic indicative of the type of processing to be performed on data from the data source. For instance, the user can be prompted to select a type of process from among a library of supported processes. Each process corresponds to a previously constructed, stored subgraph 120a-120n that can be referenced by the component 104. For instance, the system can support processes such as a mapping process, a filter process, a deduplication process (sometimes referred to as a dedupe process), an aggregation process, a replicate process, a normalization process, a partition and sort process, a change data capture process, a join process, or other processes. Other characteristics for which the user is prompted can depend on the type of process. For instance, for a mapping process, the user can enter mapping rules and identify a target dataset for the mapping. For a filter process, the user can enter filter rules. For a dedupe process, the user can enter a dedupe key and specify record selection rules. For a join process, the user can identify a join dataset and define join rules. In some examples, the user can select multiple processes and indicate the desired sequence of the selected processes.

The entered characteristics associated with the transformation icon 304 are used to automatically parameterize the component 104 as well as any relevant subgraphs 120a-120n. The component 104 is parameterized to reference the subgraph(s) that correspond to the types of processes selected by the user. Each of the referenced subgraphs is also parameterized based on the characteristics entered by the user for the corresponding process. When executed, the dataflow graph 100 will execute each of the subgraphs 120a-120n referenced by the component, with the behavior of each referenced subgraph being defined by the parameterization based on the user-entered characteristics. For instance, the dataflow graph 100 can execute each of the referenced subgraphs 120a-120n in a serial, pipeline process in which no data is stored during execution of the subgraphs.

In the examples described here, the system supports a single data source and multiple data sinks, such as up to two data sinks, five data sinks, ten data sinks, twenty data sinks, or another number of data sinks. The parameters for each data sink can be defined separately, e.g., such that each data sink can be a different type of dataset and/or can have its own set of parameters. In some examples, the system can support multiple data sources, e.g., data from multiple sources can be processed using a join process, a lookup process, or other types of processes. For instance, multiple sources can be joined into an effective single source by a join process, a lookup process, or a combination of both join and lookup processes. In some examples, the system can support a single data sink.

In some examples, the system can automatically generate a configuration based on user input providing details of a data source and a set of processing steps. For instance, the user can provide details of a data source and a set of processing steps through a user interface, such as a spreadsheet, and the system can configure a computer program automatically based on the details input by the user.

Figure 4:
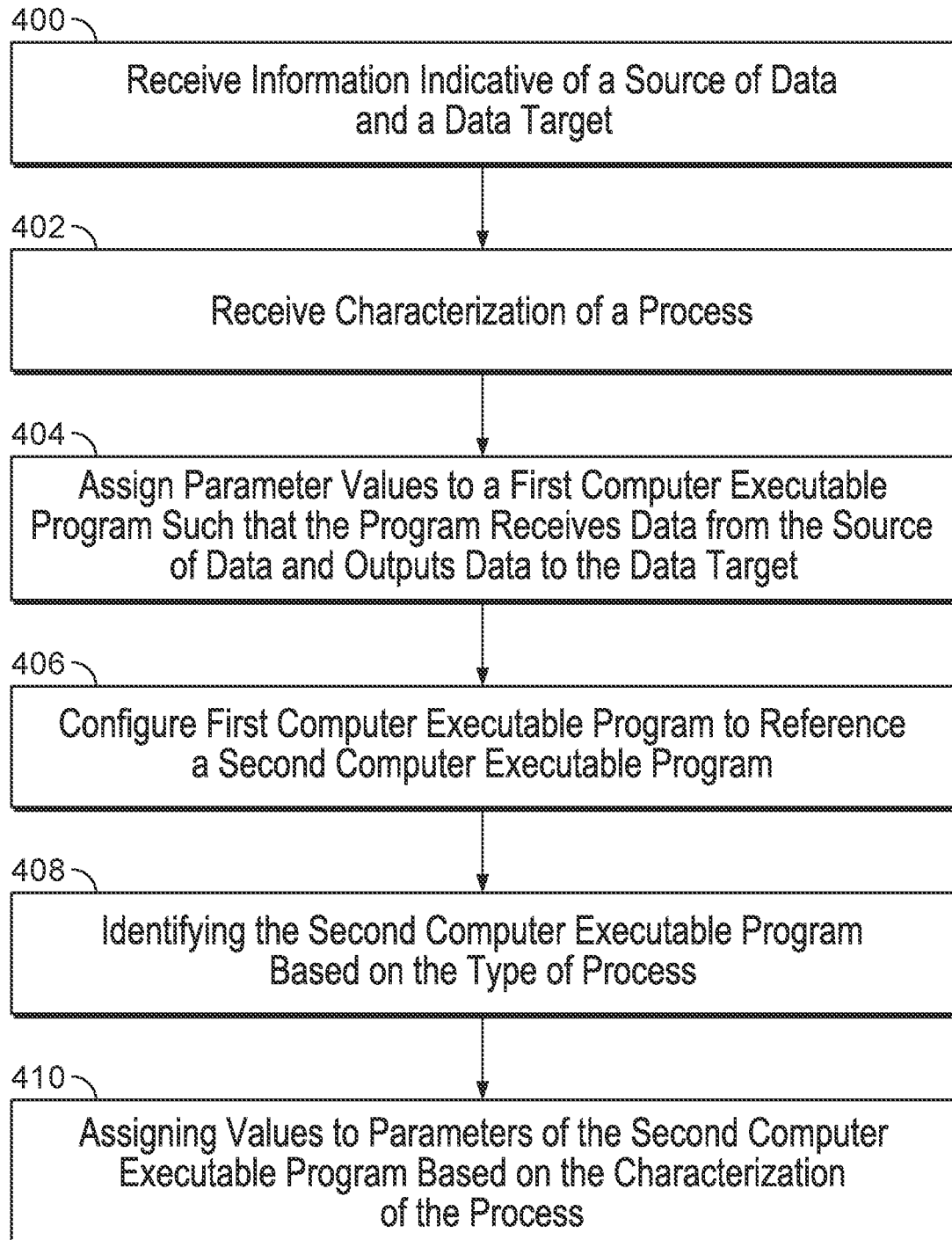
FIG. 4 is a flow chart.

Referring to FIG. 4, in an example process for configuring a first computer executable program, information indicative of a source of data and a data target is received (400). For instance, the information can indicate the type of dataset, a location or path for the dataset, and other characteristics about the dataset. A characterization of a process is received (402). The characterization includes a type of the process and values for respective characteristics of the process.

Based on the received information, values are automatically assigned to respective parameters of the first computer executable program (404) to cause the first computer executable program to receive data from the source of data and output data to the data target when the program is executed. For instance, the first computer executable program can be a dataflow graph.

Based on the received characterization of the process, the first computer executable program is automatically configured to reference a second computer executable program (406). The configuring includes identifying the second computer executable program based on the type of the process (408). The configuring also includes assigning values to respective parameters of the second computer executable program based on the values for the respective characteristics associated with the process (410). For instance, the second computer executable program can be a subgraph.

Figure 5A:
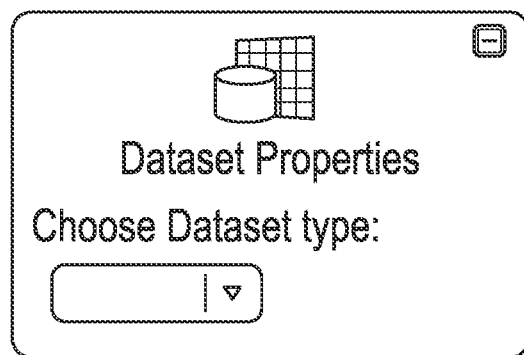
FIGS. 5A-5G are example screenshots.

FIGS. 5A-5G are examples of a configuration interface through which a user can enter information about a data source or a data target. Referring to FIG. 5A, the user is prompted to choose the type of the source or target dataset.

Figure 5B:
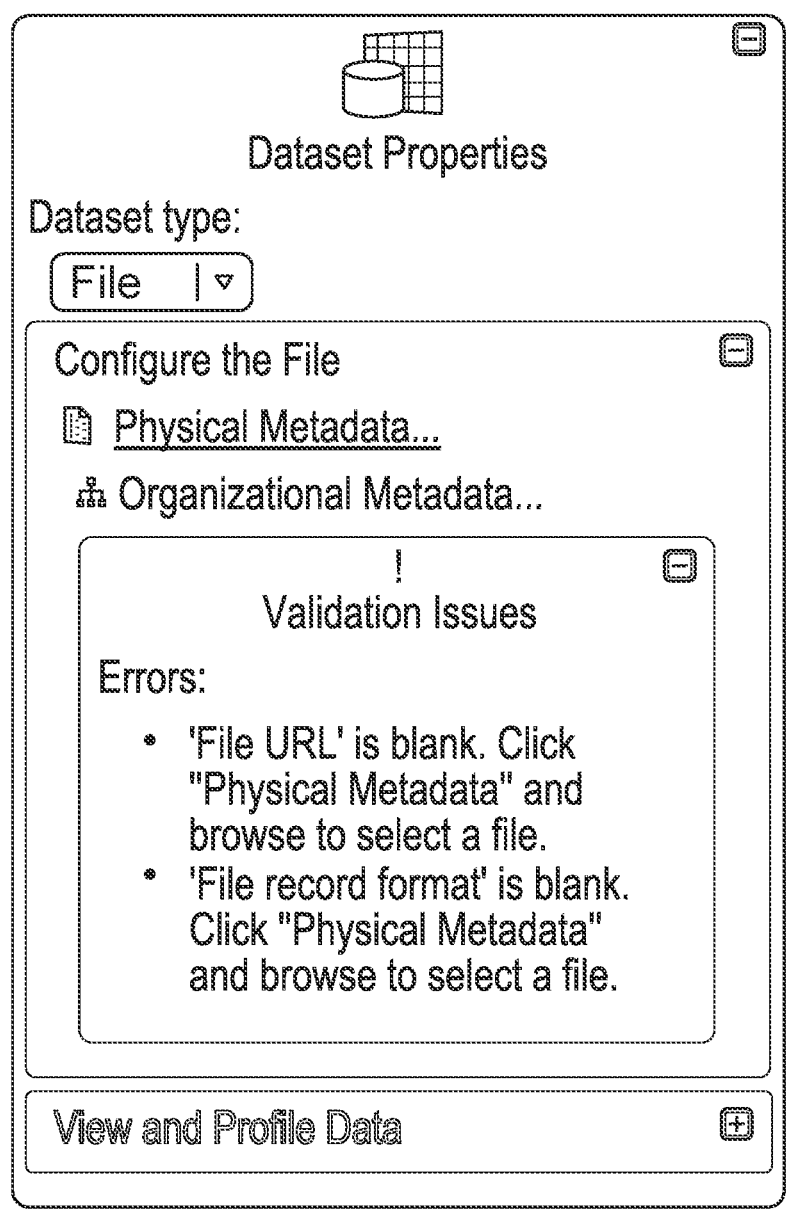
Figure 5C:
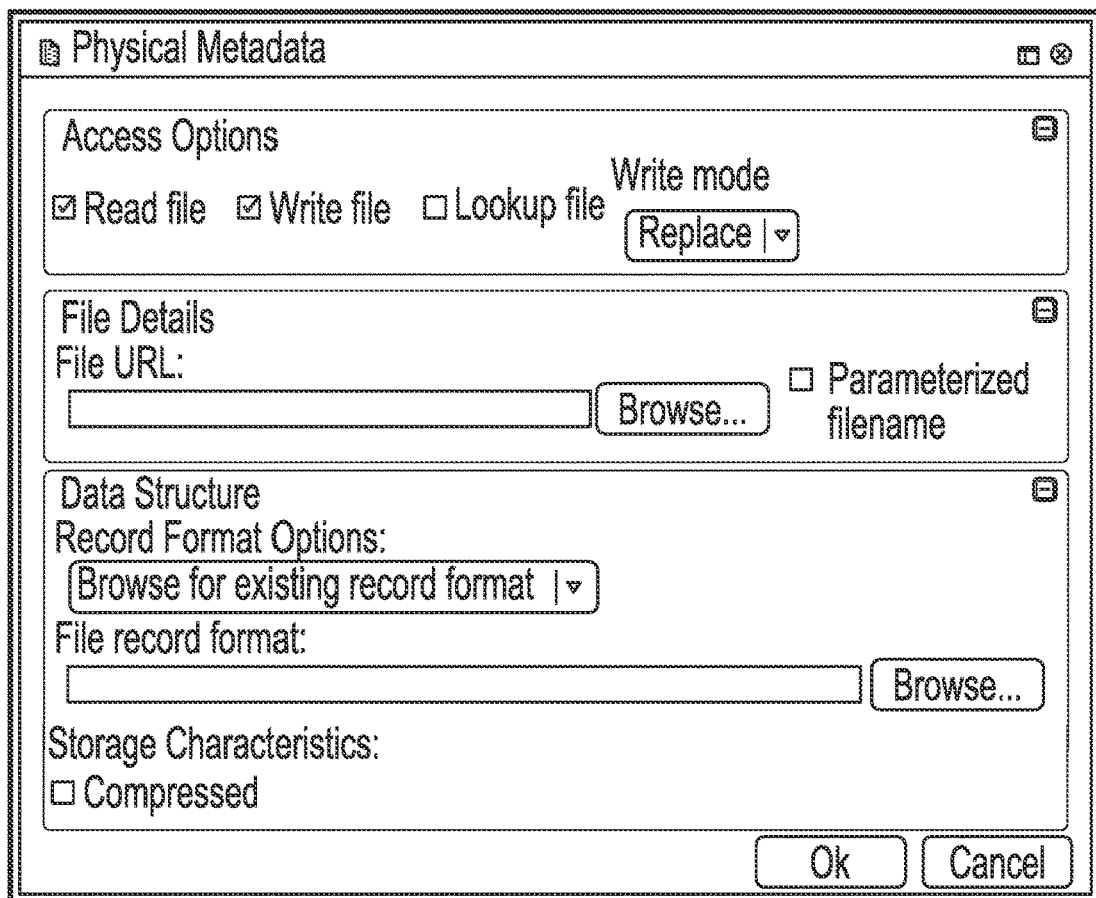

Referring to FIGS. 5B and 5C, if the type of dataset is a file, the user is prompted to enter validation details and characteristics such as one or more of the URL of the file, the record format of the file, whether the file is compressed or encrypted or both, whether to read or write the file, a natural key of the file, a data order key of the file, or other parameters.

Figure 5D:
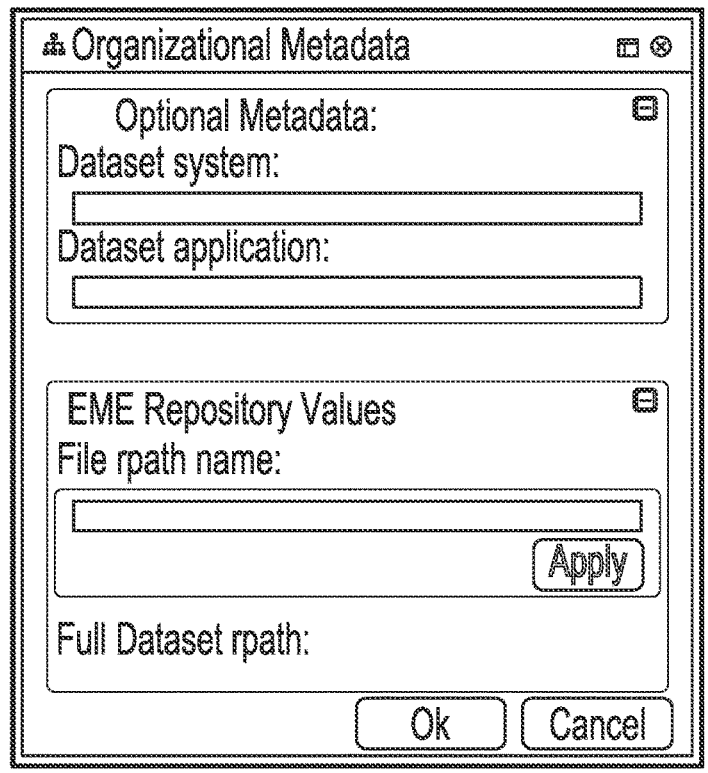

Referring to FIG. 5D, metadata about a dataset can be entered, such as an rpath or repository name of a physical file.

Figure 5E:
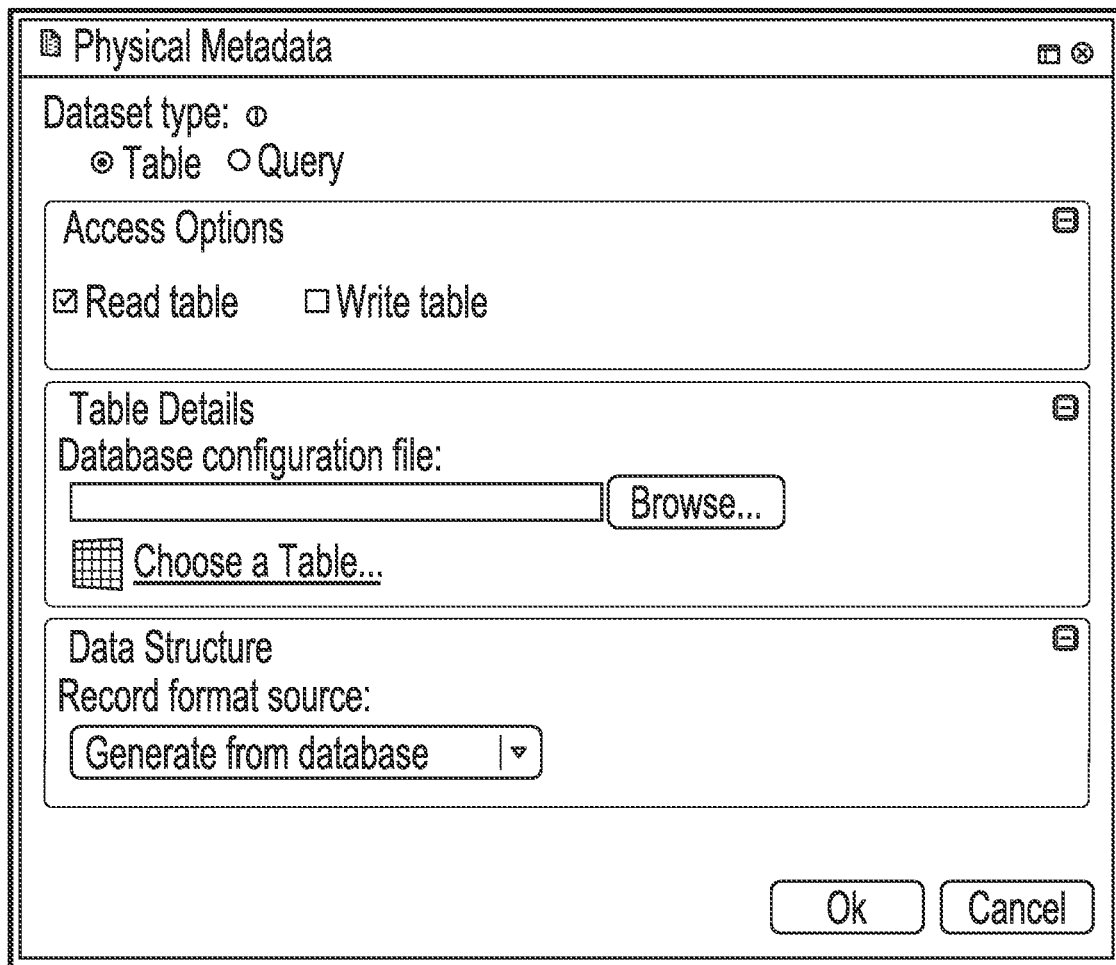

Referring to FIG. 5E, if the type of dataset is a table, the user is prompted to enter characteristics such as whether to use a table or a query (e.g., a SQL query), whether to read or write the table, a database configuration file for the table, a natural key of the table, a data order key of the table, or other parameters. If the query is selected, the user can specify the query.

Figure 5F:
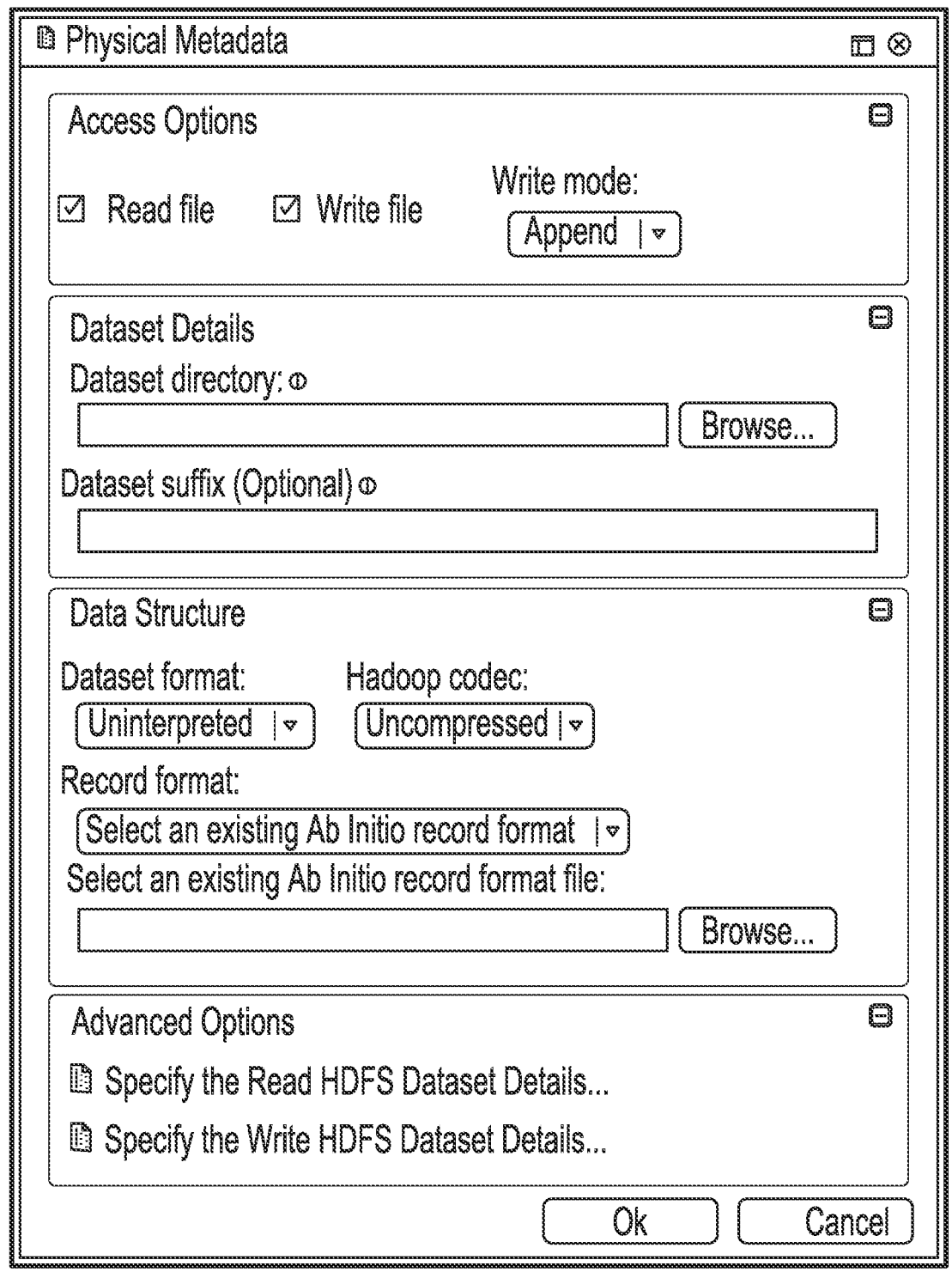

Referring to FIG. 5F, if the type of dataset is a RDFS dataset, the user is prompted to enter characteristics descriptive of the HDFS dataset, such as one or more of whether to read or write the RDFS file, the path of the RDFS filesystem, the name of the HDFS file, a suffix of the RDFS file (if any), a path to a record format file, or any of a variety of other characteristics. The user can provide characteristics indicative of the file type or format, such as the type of HDFS file to read or write, such as an uninterpreted file (e.g., uncompressed, unformatted text (e.g., ASCII or UTF8) or binary data), a row columnar format such as Apache Optimized Row Columnar format, a columnar storage format such as Apache Parquet, a binary file including key-value pairs such as a Hadoop sequence file, a binary file format such as Apache Avro, text data, or other types. The user can provide characteristics indicative of the type of compression, such as gzip, Snappy, Deflate, bzip2, zlib, LZ4, LZO, or other types of compression. The user can supply the record format for the HDFS dataset that can be derived directly from an existing HDFS dataset or can provide the record format. In some examples, the user can be prompted for additional characteristics depending on the selection of the type of file, the type of compression, or both.

Figure 5G:
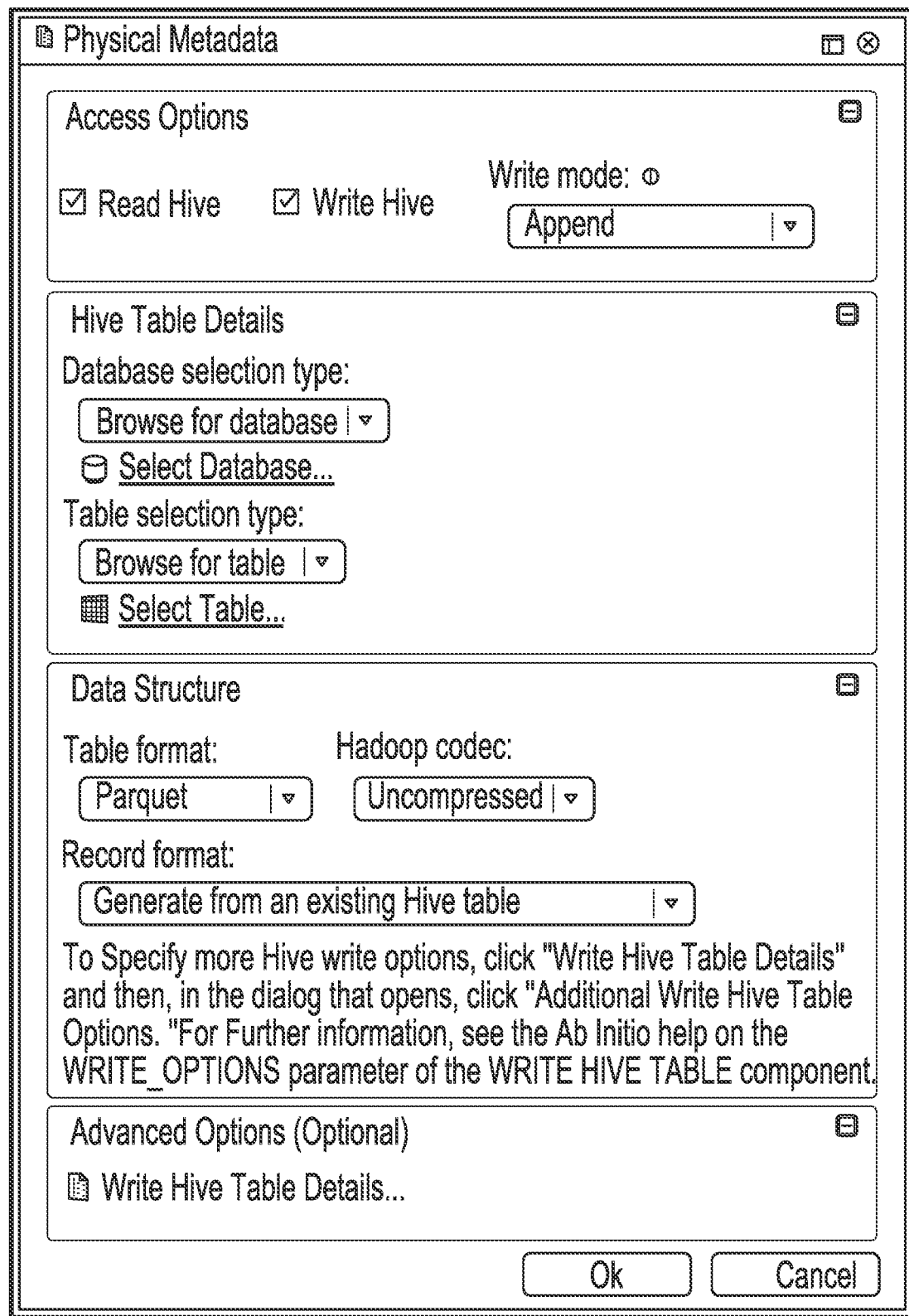

Referring to FIG. 5G, if the type of dataset is a HIVE table, the user is prompted to enter characteristics descriptive of the HIVE table, such as one or more of whether to read or write the HIVE table, the file format of the HIVE table, the record format, the path of a record format file, the database, whether the table exists, the table, or any of a variety of other characteristics. In some examples, the user can be prompted for additional characteristics depending on the selection of the type of table and/or the type of compression.

Figure 6:
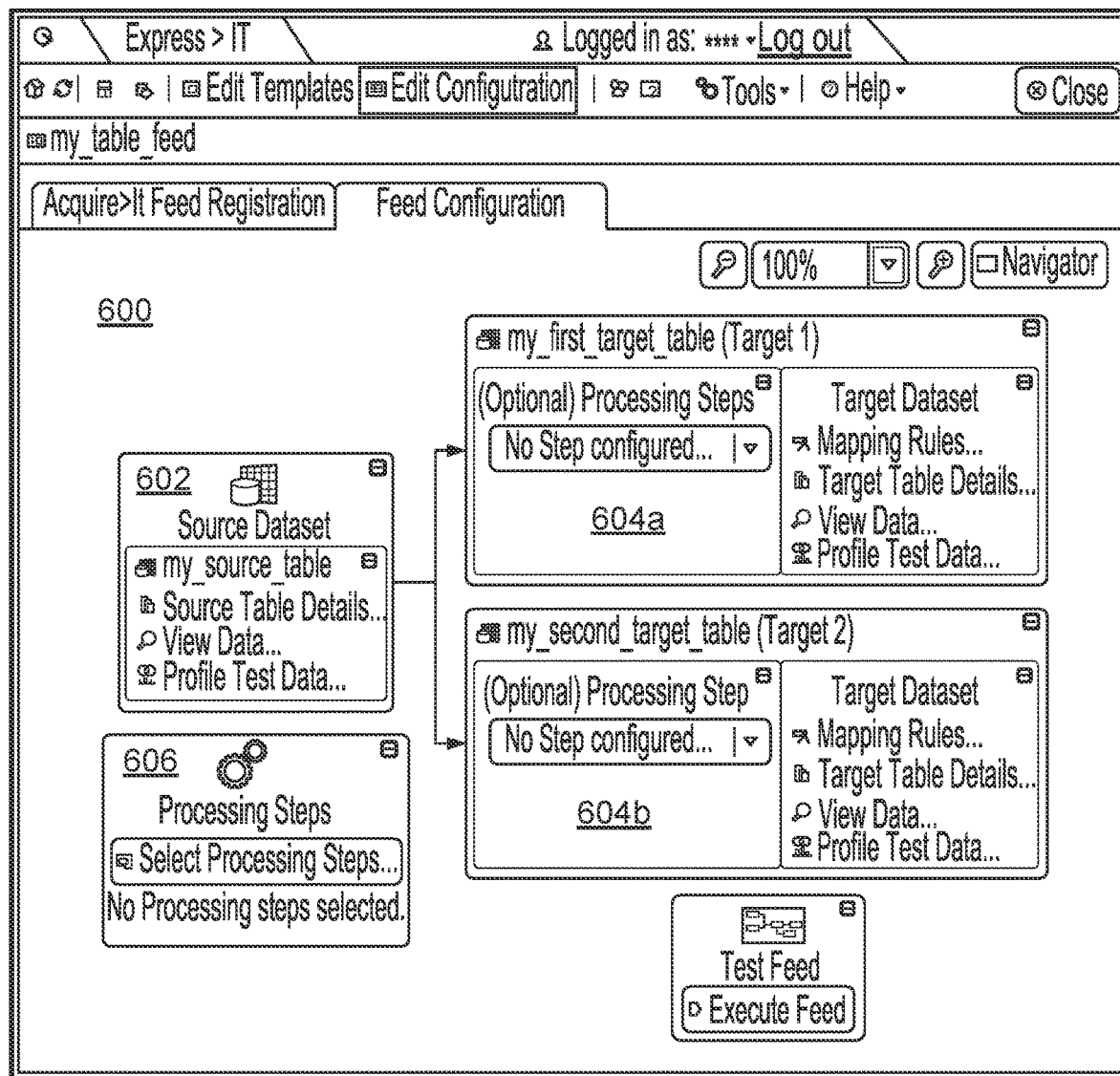
FIGS. 6-8 are example screenshots.

FIG. 6 is an example of a configuration interface 600 in which a user can define processing steps. In the example of FIG. 6, a source dataset 602 and two target datasets 604a, 604b have already been defined. A processing steps window 606 allows the user to select the processing steps to be performed on the source dataset.

Figure 7:
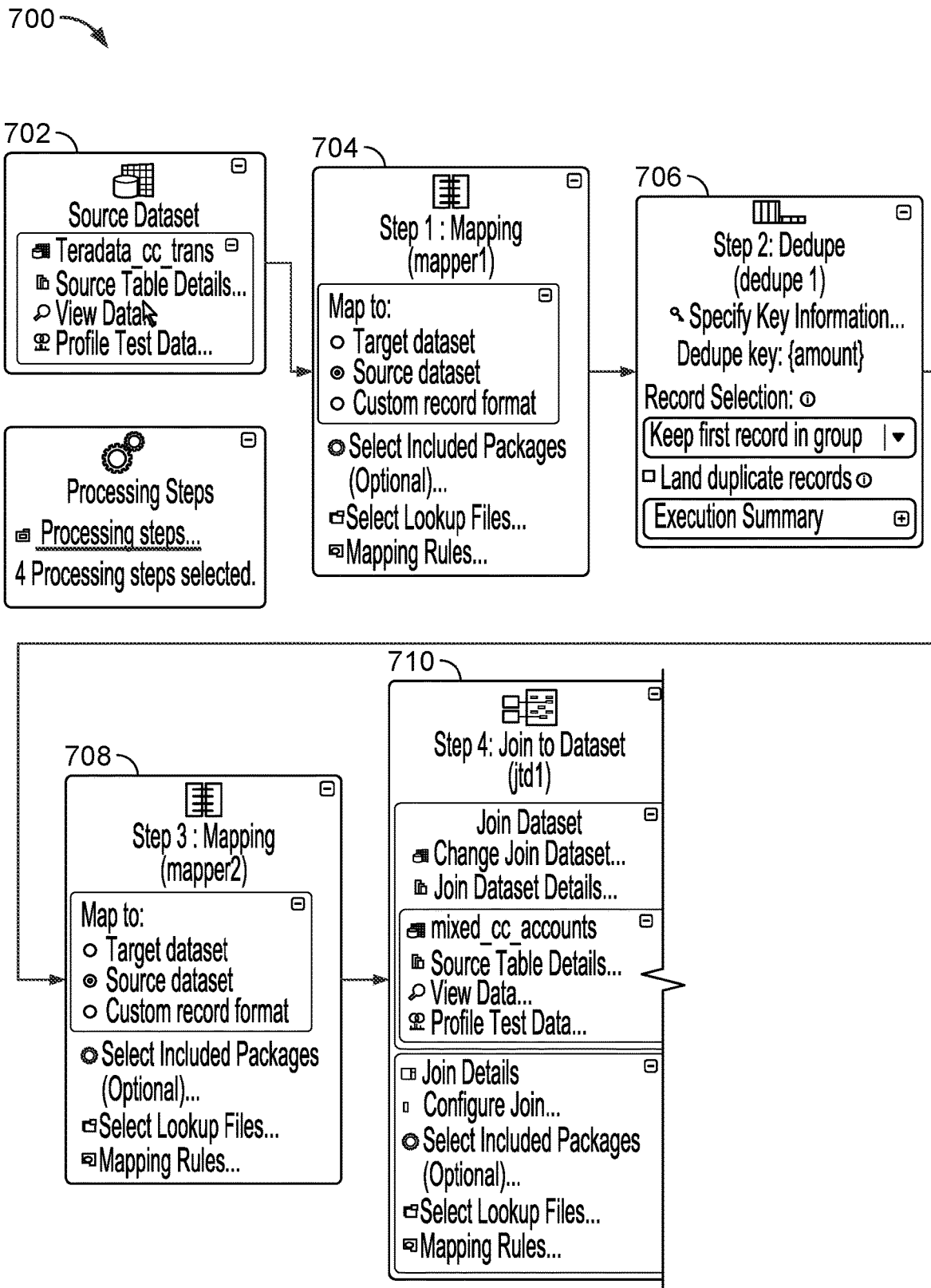

FIG. 7 is an example of a configuration interface 700 showing a feed in which a series of processing steps have been specified by the user. A source dataset 702 has been defined. Four processing steps have also been defined: a mapping step 704, a dedupe step 706, a second mapping step 708, and a join step 710. Various characteristics for each process have been specified.

When a dataflow graph is parameterized based on the feed shown in the configuration interface 700, the data source will be configured to receive data from the source table Teradata_cc_trans, as specified in the source dataset window 702. The component of the dataflow graph will be configured to reference the mapping subgraph, the dedupe subgraph, the mapping subgraph again, and the join subgraph. Each referenced subgraph will be parameterized according to the characteristics shown in the window 704-710 for the respective process.

As can be seen from the feed in the configuration interface 700, a user can enter characteristics for configuration of a dataflow graph without needing a detailed technical understanding of graph configuration. For instance, in the example of FIG. 7, the user knows the source of the data he wants to process and the destination (not shown) for the processed data. The user knows that he wants to map the source data to itself, e.g., to change the mapping of one or more fields. He knows that he wants to dedupe the mapped data using the dedupe key {amount} and keeping the first record in each group. After the dedupe step, he wants to map the data to itself again. Finally, he wants to join the deduped and mapped data to the table mixed_cc_accounts. That is, to set up this process flow, the user can understand the general data processing framework but does not need to know how to configure a dataflow graph.

In some examples, through the configuration interface 700, the user can select a set of test data to be used as the source dataset 702. For instance, rather than testing the dataflow graph using an extremely large data set (e.g., a data set with actual customer records), the user can select a smaller set of data that can be processed more quickly. In some examples, e.g., for testing purposes, the user can select a destination for the processed data that is different from the destination where the dataflow graph will send its processed data when in actual operation. For instance, the user can select a test data destination so as not to overwrite a data set with actual customer records. Regardless of the source dataset 702 and the destination of the processed data, the configuration of the other processes 706-708 remain unchanged, and thus it is straightforward for the user to update the source dataset and/or the destination as desired.

In some examples, the configuration interface 700 can provide indications of whether the parameters entered by the user make sense. For instance, process keys entered by the user can be validated against each other. In an example, if a user creates a dataflow graph that dedupes a data set using a first key and sorts the resulting deduped data using a second key, an alert can be displayed in the configuration interface.

In some examples, after the user has configured the dataflow graph, the system can determine how to execute the dataflow graph, e.g., to reduce processing time or computational cost. For instance, for a given process, the system can determine whether to repartition the data based on parameters of one or more upstream processes, such as keys used in upstream processes. In an example, if a similar key is used in an upstream process, the system may determine that a repartitioning of the data with the same key in a downstream process is unnecessary. The determination of whether repartitioning or sorting are appropriate can be performed automatically, without user input.

Figure 8:

In some examples, information indicative of the performance of the dataflow graph can be displayed in the configuration interface 700 during execution of the dataflow graph. The information can include information indicative of the number of records into and out of each processing step. For instance, the dedupe step 706 can record and display the number of records in, the number of records out, and the number of records discarded as duplicates. The join step 710 can record and display the number of records in from a first dataset, the number of records in from a second dataset, the number of records out, and the number of records discarded from each dataset. This information can provide quick feedback to the user, e.g., indicative of whether he has configured the dataflow graph the way he intended, thus providing a way for a non-technical user to troubleshoot and debug the dataflow graph. For instance, referring to FIG. 8, a non-technical user who sees that 115,911 records were read into a dedup step, of which 108,191 were discarded as duplicates can use this information to determine that a parameter, such as the dedup key, may have been configured incorrectly.

In some examples, the configuration interface 700 can be presented as a spreadsheet interface through which the user can build and configure a dataflow graph.

In some examples, source datasets, target datasets, or both can be created, e.g., based on characteristics identifying data to be used, such as data in spreadsheets, databases, or other locations.

Figure 9A:
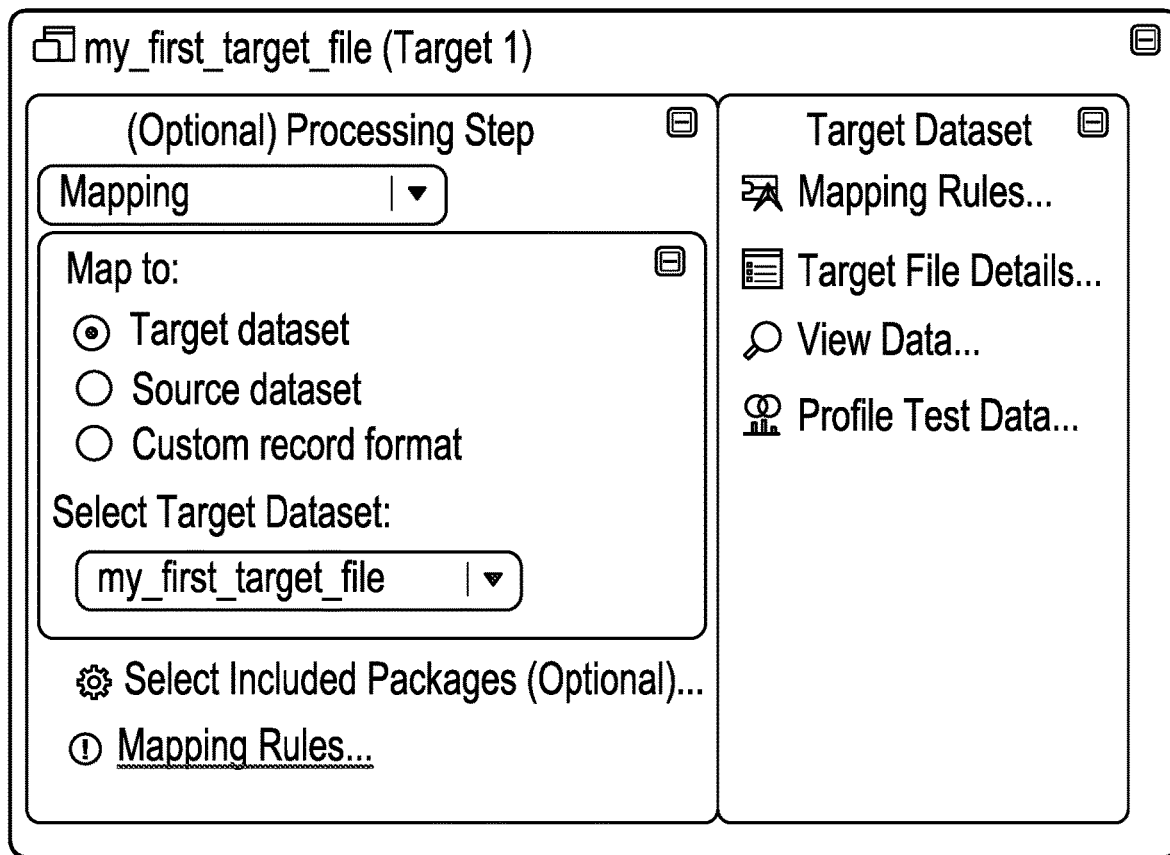
FIGS. 9A and 9B are example screenshots.
Figure 9B:
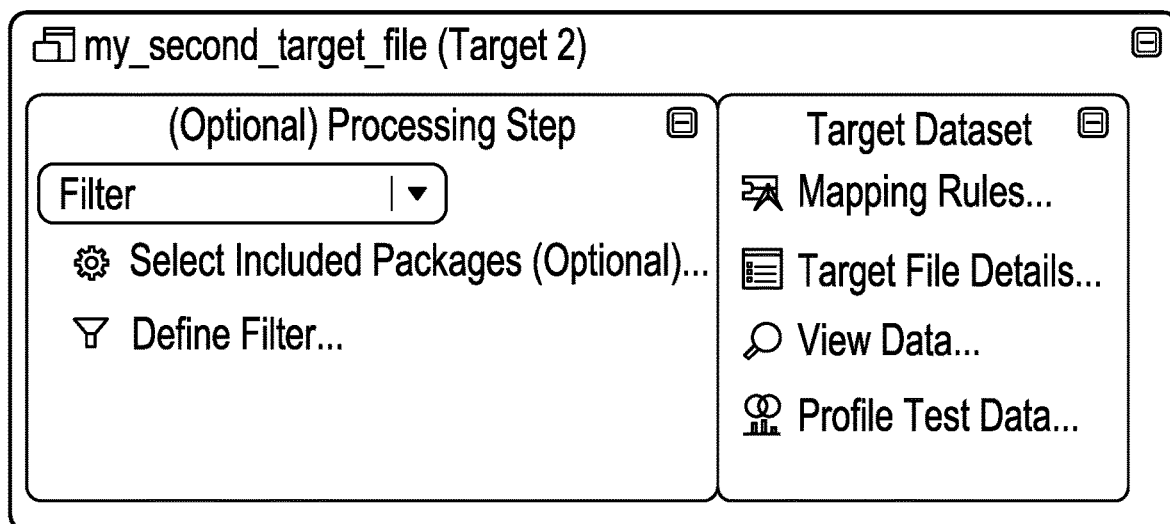

Referring to FIGS. 9A and 9B, in some examples, a target-specific process, such as a mapping or filter process, respectively, can be applied before sending the processed data from the dataflow graph to the data target.

Figure 10:
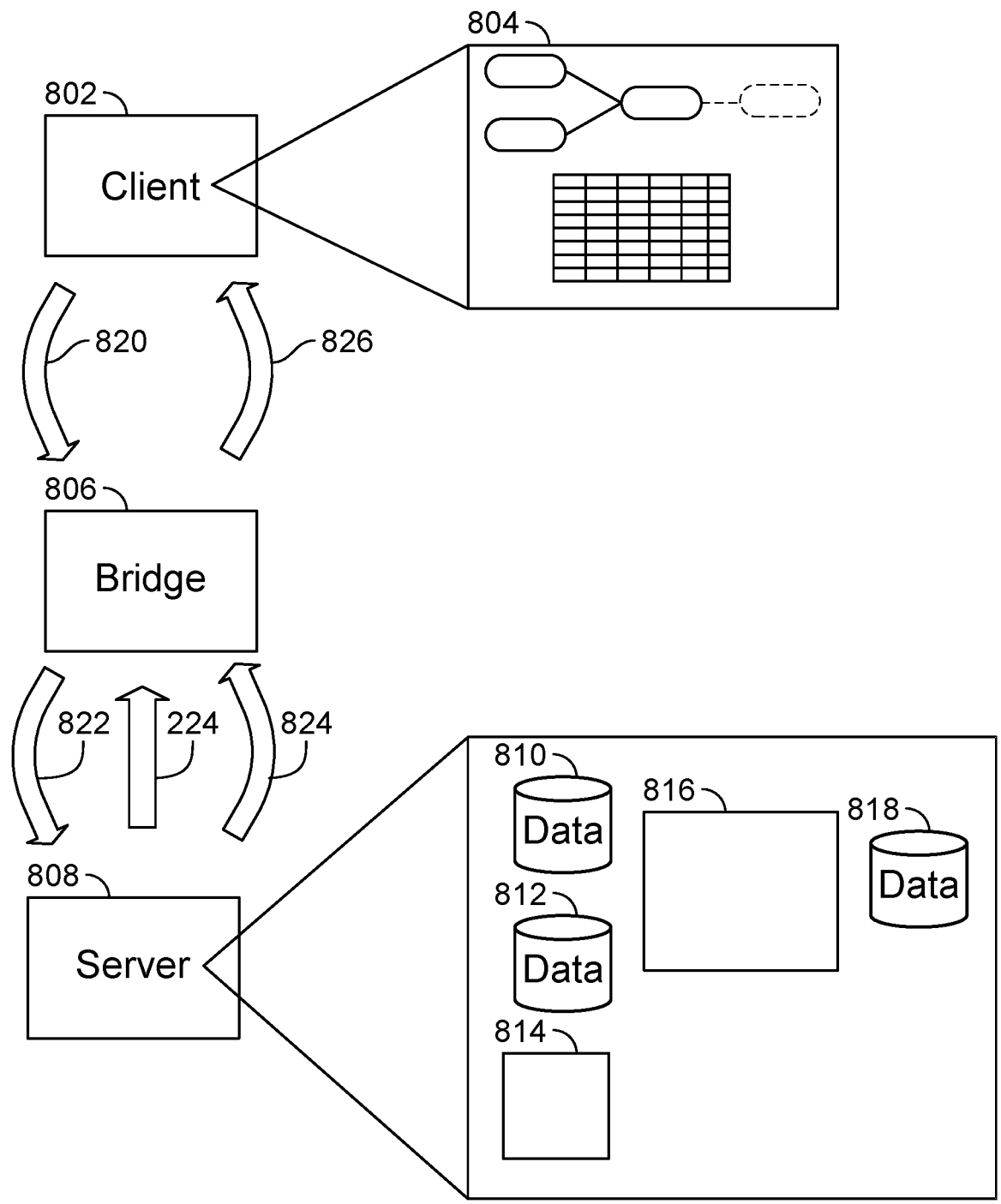
FIG. 10 is a system diagram.

Referring to FIG. 10, a client system 802 may be displaying a configuration interface 804 to the user. A parameter set 814 generated based on interactions with the user through the configuration interface 804 may be stored on a server 808. Consequently, changes made by the configuration interface 804 are sent from the client 802 to the server 808 via a bridge 806. Represented by arrow 820, the client 802 sends a message to the bridge 806 in one format, for example a message sent using the simple object access protocol (SOAP). The bridge 806 translates the message into a new format and if necessary begins a client session with the server 808. Represented by arrow 822, the bridge 806 sends a message to the server 808 in a format understood by the server 808, for example a COM+ message. The server 808 receives the message and updates the parameter set. Represented by arrow 824, the server 808 send a reply to the bridge 806 containing any changes that occurred to the parameter set due to the input received by the client 802. The bridge 806 decodes the message and creates a reply message for the client 802. Represented by arrow 826, the bridge 806 sends the reply message to the client 802. The client 802 updates the configuration interface 804 to reflect the changes, including displaying any components which were previously hidden due to the failure of a precondition as described above.

The user may also indicate to the client 802 that he wishes to execute the dataflow graph being constructed using sample data based on the current set of parameters, which may or may not be complete. As above, the client 802 sends a message to the server 808 via the bridge 806. The server 808 applies any changes to the parameter set and a process 816 running on the server compiles the dataflow graph. The compiled dataflow graph accepts data from the sample datasets 810, 812 and executes the compiled dataflow graph. The dataflow graph produces the requested output to an output dataset 818. The output of the dataflow graph is the intermediate data requested by the client 802 and not necessarily the data which would be produced by complete execution of the dataflow graph.

As described above, the resulting data is sent from the server 808 to the client 802 via the bridge 806.

The graph configuration approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A method for configuring a first computer executable program, the method including:
  receiving, through a user interface, a selection of a type of a process from among a set of multiple process types displayed in the user interface, each of the multiple process types corresponding to a respective second computer program, each second computer program configurable to receive data records, process data records, and output processed data records;
  responsive to receiving the selection of the type of process, displaying, in the user interface, a prompt for information about one or more characteristics associated with a process of the selected type, wherein the prompt is based on the selected type of process;
  through the user interface, responsive to the prompt, receiving the information about the one or more characteristics associated with the process of the selected type;
  automatically configuring the first computer executable program to reference a particular second computer program that is configurable to receive data records, process data records, and output processed data records, the configuring including:
    automatically identifying the particular second computer program to which the selected type of process corresponds;
    based on the received information about the one or more characteristics of the process, automatically determining values for each of one or more parameters of the particular second computer program, wherein values for parameters of a computer program define a behavior of the computer program when the computer program is executed; and
    automatically assigning the determined values to respective parameters of the particular second computer program to configure the second computer program with respect to receiving data records, processing data records, and outputting processed data records,
    wherein when the first computer executable program is executed, the assignment of the determined values to the respective parameters of the particular second computer program causes the particular second computer program to behave according to the characteristics of the process indicated by the received information.

2. The method of claim 1, in which the first computer executable program includes a first dataflow graph including one or more nodes representing data processing components and one or more links representing flows of data between the data processing components.

3. The method of claim 1, in which the second computer program includes a second dataflow graph including one or more nodes representing data processing components and one or more links representing flows of data between the data processing components.

4. The method of claim 1, including determining the prompt based on the type of the process.

5. The method of claim 1, wherein the process types of the set of multiple process types include one or more of a mapping process, a filter process, a deduplication process, an aggregation process, a replicate process, a normalization process, a partition and sort process, a change data capture process, or a join process.

6. The method of claim 1, including automatically configuring the first computer executable program to reference the second computer program at runtime of the first computer executable program.

7. The method of claim 1, in which automatically configuring the first computer executable program to reference the second computer program includes configuring the first computer executable program to execute the second computer program during execution of the first computer executable program.

8. The method of claim 1, in which the first computer executable program includes a data source component and a data target component, and in which automatically assigning values to respective parameters of the first computer executable program comprises:
   assigning, to the data source component of the first computer executable program, a value for a parameter of the data source component, the value indicative of the source of data; and
   assigning, to the data target component of the first computer executable program, a value for a parameter of the data target component, the value indicative of the data target.

9. A non-transitory computer readable medium storing instructions for causing a computing system to configure a first computer executable program, the instructions including instructions for causing the computing system to:
   receive, through a user interface, a selection of a type of a process from among a set of multiple process types displayed in the user interface, each of the multiple process types corresponding to a respective second computer program, each second computer program configurable to receive data records, process data records, and output processed data records;
   responsive to receiving the selection of the type of process, display, in the user interface, a prompt for information about one or more characteristics associated with a process of the selected type, wherein the prompt is based on the selected type of process;
   through the user interface, responsive to the prompt, receive the information about the one or more characteristics associated with the process of the selected type;
   automatically configure the first computer executable program to reference a particular second computer program that is configurable to receive data records, process data records, and output processed data records, the configuring including:
      automatically identifying the particular second computer program to which the selected type of process corresponds;
      based on the received information about the one or more characteristics of the process, automatically determining values for each of one or more parameters of the particular second computer program, wherein values for parameters of a computer program define a behavior of the computer program when the computer program is executed; and
      automatically assigning the determined values to respective parameters of the particular second computer program to configure the second computer program with respect to receiving data records, processing data records, and outputting processed data records,
      wherein when the first computer executable program is executed, the assignment of the determined values to the respective parameters of the particular second computer program causes the particular second computer program to behave according to the characteristics of the process indicated by the received information.

10. The non-transitory computer readable medium of claim 9, in which the first computer executable program includes a first dataflow graph including one or more nodes representing data processing components and one or more links representing flows of data between the data processing components.

11. The non-transitory computer readable medium of claim 9, in which the second computer program includes a second dataflow graph including one or more nodes representing data processing components and one or more links representing flows of data between the data processing components.

12. The non-transitory computer readable medium of claim 9, the instructions including instructions for causing the computing system to determine the prompt based on the type of the process.

13. The non-transitory computer readable medium of claim 9, wherein the process types of the set of multiple process types include one or more of a mapping process, a filter process, a deduplication process, an aggregation process, a replicate process, a normalization process, a partition and sort process, a change data capture process, or a join process.

14. The non-transitory computer readable medium of claim 9, the instructions including instructions for causing the computing system to automatically configure the first computer executable program to reference the second computer program at runtime of the first computer executable program.

15. The non-transitory computer readable medium of claim 9, in which automatically configuring the first computer executable program to reference the second computer program includes configuring the first computer executable program to execute the second computer program during execution of the first computer executable program.

16. The non-transitory computer readable medium of claim 9, in which the first computer executable program includes a data source component and a data target component, and in which automatically assigning values to respective parameters of the first computer executable program comprises:

assigning, to the data source component of the first computer executable program, a value for a parameter of the data source component, the value indicative of the source of data; and assigning, to the data target component of the first computer executable program, a value for a parameter of the data target component, the value indicative of the data target.

17. A computing system for configuring a first computer executable program, the computing system including:

one or more processors and a memory, the one or more processors and memory configured to:

receive, through a user interface, a selection of a type of a process from among a set of multiple process types displayed in the user interface, each of the multiple process types corresponding to a respective second computer program, each second computer program configurable to receive data records, process data records, and output processed data records;

responsive to receiving the selection of the type of process, display, in the user interface, a prompt for information about one or more characteristics associated with a process of the selected type, wherein the prompt is based on the selected type of process;

through the user interface, responsive to the prompt, receive the information about the one or more characteristics associated with the process of the selected type;

automatically configure the first computer executable program to reference a particular second computer program that is configurable to receive data records, process data records, and output processed data records, the configuring including:

automatically identifying the particular second computer program to which the selected type of process corresponds;

based on the received information about the one or more characteristics of the process, automatically determining values for each of one or more parameters of the particular second computer program, wherein values for parameters of a computer program define a behavior of the computer program when the computer program is executed; and automatically assigning the determined values to respective parameters of the particular second computer program to configure the second computer program with respect to receiving data records, processing data records, and outputting processed data records, wherein when the first computer executable program is executed, the assignment of the determined values to the respective parameters of the particular second computer program causes the particular second computer program to behave according to the characteristics of the process indicated by the received information.

18. The computing system of claim 17, in which the first computer executable program includes a first dataflow graph including one or more nodes representing data processing components and one or more links representing flows of data between the data processing components.

19. The computing system of claim 17, in which the second computer program includes a second dataflow graph including one or more nodes representing data processing components and one or more links representing flows of data between the data processing components.

20. The computing system of claim 17, the one or more processors and memory configured to determine the prompt based on the type of the process.

21. The computing system of claim 17, wherein the process types of the set of multiple process types include one or more of a mapping process, a filter process, a deduplication process, an aggregation process, a replicate process, a normalization process, a partition and sort process, a change data capture process, or a join process.

22. The computing system of claim 17, the one or more processors and memory configured to automatically configure the first computer executable program to reference the second computer program at runtime of the first computer executable program.

23. The computing system of claim 17, in which automatically configuring the first computer executable program to reference the second computer program includes configuring the first computer executable program to execute the second computer program during execution of the first computer executable program.

24. The computing system of claim 17, in which the first computer executable program includes a data source component and a data target component, and in which automatically assigning values to respective parameters of the first computer executable program comprises:

assigning, to the data source component of the first computer executable program, a value for a parameter of the data source component, the value indicative of the source of data; and assigning, to the data target component of the first computer executable program, a value for a parameter of the data target component, the value indicative of the data target.

* * * * *